United States Patent
Klaghofer

(10) Patent No.: US 7,408,922 B2
(45) Date of Patent: Aug. 5, 2008

(54) COMMUNICATION BETWEEN SWITCHED-CIRCUIT COMMUNICATION NETWORK AND VOIP NETWORK DOMAINS

(75) Inventor: Karl Klaghofer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 953 days.

(21) Appl. No.: 10/655,583

(22) Filed: Sep. 5, 2003

(65) Prior Publication Data

US 2004/0174864 A1    Sep. 9, 2004

(30) Foreign Application Priority Data

Sep. 5, 2002   (DE)   ................. 102 41 202

(51) Int. Cl.
*H04L 12/66* (2006.01)
(52) U.S. Cl. ...................... 370/352; 370/401
(58) Field of Classification Search .......... 370/352, 370/401
See application file for complete search history.

(56) References Cited

U.S. PATENT DOCUMENTS 6,987,756 B1 *  1/2006  Ravindranath et al. ...... 370/352

FOREIGN PATENT DOCUMENTS

WO    99/14932    3/1999

OTHER PUBLICATIONS

Series H: Audiovisual and Multimedia Systems Infrastructure of audiovisual services—Systems and terminal equipment for audiovisual services, Packet-based multimedia communications systems ITU-T Recommendation H.323 (1998).

J. Toga et al., "ITU-T standardization activities for interactive multimedia communications on packet-based networks: H.323 and related recommendations" Computer Networks, vol. 31, Elsevier Science Publishers B.V., Amsterdam, NL, Feb. 11, 1999, pp. 205-223.

"Telecommunications and Internet Protocol Harmonization Over Networks (TIPHON); Signalling for basic calls and inter domain calls, between an H.323 Terminal and a Terminal in a Switched-Circuit Network (SCN) Phase II: Scenario 1 + Scenario 2"; TS 101 322 V1.0.0, ETSI, Jul. 1999, pp. 1-30.

European Search Report, mailed Sep. 12, 2005 and Issued in corresopnding European Patent Application No. 03102571.1-2413.

* cited by examiner

*Primary Examiner*—Stella L Woo
(74) *Attorney, Agent, or Firm*—Staas & Halsey LLP

(57) ABSTRACT

A gateway device is connected between a switched-circuit communication network and at least two VoIP network domains, each domain having a packet-based signaling controller. The gateway device transfers to each of the signaling controllers a registration request message so that the gateway device is simultaneously registered in the at least two VoIP network domains as a VoIP end point.

11 Claims, 2 Drawing Sheets

COMMUNICATION BETWEEN SWITCHED-CIRCUIT COMMUNICATION NETWORK AND VOIP NETWORK DOMAINS

CROSS REFERENCE TO RELATED APPLICATIONS

This application is based on and hereby claims priority to German Application No. 102 41 202.2 filed on Sep. 5, 2002, the contents of which are hereby incorporated by reference.

BACKGROUND OF THE INVENTION

In present-day communication systems communication links, in particular real-time connections, e.g., for voice, video or multimedia communication, are increasingly also routed via packet-oriented networks such as Local Area Networks (LANs) or Wide Area Networks (WANs). For example, Internet telephony, frequently also referred to as Voice over Internet Protocol (VoIP) telephony, is based on this technology.

These types of packet-oriented communication networks are frequently linked via gateway equipment to conventional switched-circuit communication networks, such as public or private Integrated Services Digital Network (ISDN) networks in order to implement connections across networks. Such a gateway facility between a packet-oriented and a switched-circuit communication network enables communication links to be routed from the switched-circuit into the packet-oriented communication network and vice versa. In this case the gateway facility performs the required signaling and protocol conversions between the signaling that are used in the packet-oriented and in the switched-circuit communication network.

Currently packet-oriented communication networks for setting up real time communication links are frequently based on ITU-T Recommendation H.323 or on the IETF Standard SIP (Session Initiation Protocol). This type of communication system is frequently also referred to as a VoIP system. The expression VoIP in this document is taken to refer to not only Internet protocol-based speech transmission but also to Internet protocol-based transmission of different media types such as video, fax, data and/or multimedia.

In a VoIP system the terminals and gateway facility belonging to the system register with a central signaling controller of the VoIP system in order to make themselves known in this way to the VoIP system. In VoIP systems in accordance with the H.323 Recommendation a signaling controller of this type is known as a gatekeeper. As well as the registration of terminals and gateway devices, another of the gatekeeper's functions is to resolve called destination addresses into Internet protocol-based transport addresses.

A VoIP system which is administered by one or more logically linked gatekeepers is frequently also referred to as a VoIP domain.

In accordance with the H.323 Recommendation a gateway device is handled by a gateway like a VoIP end point and, like other VoIP end points is assigned to precisely one gatekeeper by registration. On registration the gateway device stores its transport address with the gatekeeper assigned to it so that the gatekeeper can if necessary forward connection signaling to the gateway device.

Because of the assignment of a gateway device to precisely one gatekeeper a number of gateway devices are needed to link a number of VoIP domains to a switched-circuit communication network. However as a rule this requires a significant investment in hardware.

SUMMARY OF THE INVENTION

An object of the present invention is to provide a system for communication, in particular real-time communication between a switched-circuit communication network and a number of VoIP network domains, which requires less effort than the prior art.

For communication, in particular real-time communication between a switched-circuit communication network, e.g., a public or private ISDN network, and at least two VoIP domains each featuring a packet-based signaling controller, a gateway device in accordance with the invention is to be provided. This is connected between the switched-circuit communication network and the VoIP network domain and transfers a registration request message to the signaling controllers in each case so that the gateway device is simultaneously registered in at least two VoIP network domains as a VoIP end point.

Through the registration of the gateway devices as a VoIP end points in the VoIP network domain communication links can be switched from all of these VoIP network domains to the gateway device and thereby into the switched-circuit communication network. Accordingly communication connections can be forwarded from the switched-circuit communication network through the gateway device into all these VoIP network domains. In addition a gateway device can also serve as a transfer point for communication links between various of these VoIP network domains Without a communication link having to be created between their signaling controllers.

A major benefit of the invention lies in the fact that through the multiple registration of the gateway device at a number of signaling devices of different VoIP networks the number of gateway devices needed for communication between a switched-circuit communication network and a number of the VoIP network domains is reduced. In particular the number of gateway devices needed is no longer necessarily dependent on the number of the VoIP network domains to be linked, but can be dimensioned to be dependent on the overall communication volume. By reducing the number of gateway devices needed the required hardware and also administration effort is significantly reduced.

In accordance with one advantageous form of embodiment of the invention the registration request messages can be transferred in parallel to the signaling controllers. In this way the length of time necessary for the registration can be significantly reduced.

Furthermore the gateway device can broadcast a polling message into the VoIP network domains before its registrations in order to determine the network addresses of the signaling controllers in this way. A relevant network address will be transferred by the relevant signaling controller to the gateway device on receipt of the polling message. The gateway device can subsequently transfer the registration request messages to the signaling controllers using the network addresses determined. A broadcast of the polling message into a VoIP network domain is also referred to, in accordance with ITU-T recommendation H.232 as "gatekeeper discovery". Alternatively, for an active polling of the network addresses at the signaling controllers, their network addresses can be preconfigured in the gateway device.

Furthermore, as part of a call setup, a circuit-oriented connection message with destination address information identifying the communication destination can be received as part of a connection setup from a circuit-oriented communication network. The destination address information can for example be what is known as an alias address, such as a URL (Uniform Resource Locator) for example, a public or a private telephone number or an e-mail address. As a result of receiving the connection setup message the gateway device can transfer an address resolution request message in each case with the received destination address information sequentially or in parallel to the signaling controllers. Subsequently a packet-oriented connection setup message, e.g., in accordance with ITU-T Recommendation H.225.0 can be transferred by the gateway device into the relevant VoIP network domain of which the signaling controller transfers back an address resolution message that indicates a successful address resolution of the destination address information. Preferably the address resolution request at a relevant signaling controller can be used to initiate an admission check with regard to the admission of the connection.

Furthermore destination address information received from the switched-circuit communication network can be evaluated by the registered gateway device and, depending on this evaluation, a selection relating to further connection setup can be made between the VoIP network domains und/or signaling controllers. In this case for example different prefixes of prefix codes to be dialed by the subscriber can be provided for different network domains. The evaluation can be performed using numbers or address tables stored in the gateway device.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
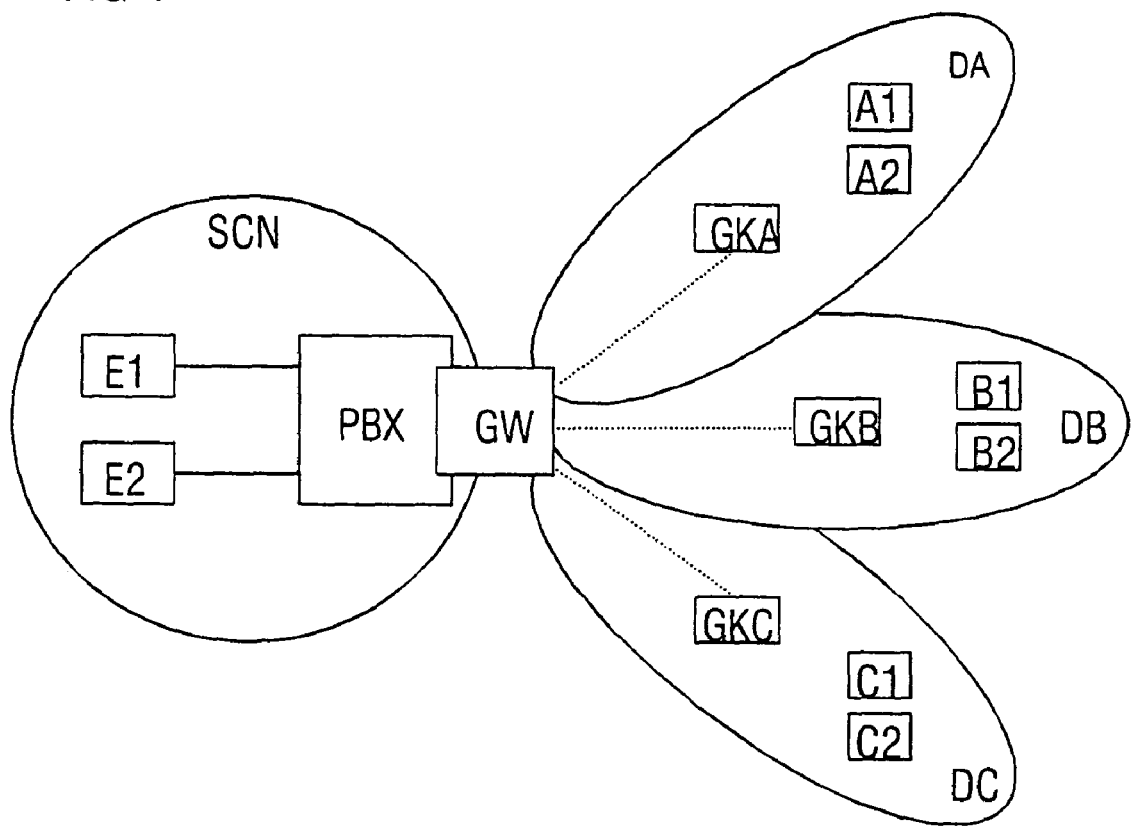
FIG. 1 is a block diagram of a communication system with a gateway device switched between a switched-circuit communication network and a number of VoIP network domains.

Reference will now be made in detail to the preferred embodiments of the present invention, examples of which are illustrated in the accompanying drawings, wherein like reference numerals refer to like elements throughout.

FIG. 1 is a schematic diagram of a communication system in which a switched-circuit communication network SCN, e.g., an ISDN network, is linked via a gateway device GW to a number of VoIP network domains DA, DB and DC. The VoIP network domains DA, DB and DC are Internet protocol-based communication networks such as Local Area Networks (LAN) or Wide Area Networks (WAN), e.g., the Internet or logical subnetworks of this network. In the VoIP network domains DA, DB and DC communication protocols based on the Internet protocol are used for the switched-circuit communication, e.g., for the voice, video, fax, data and/or multimedia communication. For the present exemplary embodiment it is assumed that the VoIP network domains DA, DB and DC are created in accordance with ITU-T Recommendation H.323. As an alternative to this the VoIP network domains DA, DB und DC can also be implemented in accordance with the ZETF Standard SIP (Session Initiation Protocol).

The gateway device GW is connected as a gateway device between the switched-circuit communication network SCN and the VoIP network domains DA, DB und DC. All packet-oriented Internet protocols are terminated on the VoIP network domain DA, DB and DC side by gateway device GW. In particular the gateway device GW does not represent what is known as a proxy. The gateway device GW is preferably implemented by a gateway according to the H.323 Recommendation, and in accordance with the invention is designed in such a way that it can be registered simultaneously in a number of VoIP network domains, here DA, DB und DC.

The switched-circuit communication network SCN includes a circuit-oriented, e.g., TDM-based (where TDM stands for Time Division Multiplex), switching unit PBX as well as a circuit-oriented terminals EI and E2 which are connected to the switching unit PBX. In the following exemplary embodiment gateway device GW is integrated into switching unit PBX and serves to link it to one or more packet-oriented communication networks, here the VoIP network domains DA, DB and DC. This type of switching unit that can be linked to a packet-oriented communication network is frequently also referred to as an IP-PBX. The switching unit PBX preferably communicates with the gateway device GW via the so-called QSIG signaling protocol, which is frequently also referred to as the "Unified International Corporate Network Signaling Standard". Terminals E1 und E2 can typically be terminals for voice, video, fax or Multimedia communication.

The VoIP network domains DA, DB and DC each feature a so-called gatekeeper GKA, GKB or GKC as their central signaling and/or connection controller in accordance with the H.323 Recommendation. If the VoIP network domains DA, DB and DC were implemented in accordance with the alternative SIP Standard, instead of the relevant gatekeeper a so-called SIP Registrar or SIP Proxy could be used as signaling and/or connection controller.

One of the functions of the gatekeepers GKA, GKB and GKC is to resolve the addresses in their relevant VoIP network domains, i.e. to convert called destination addresses, e.g., alias addresses such as URLs, telephone numbers or e-mail addresses, into transport addresses for data transport in the appropriate VoIP network domain.

A relevant signaling in each case, e.g., in accordance with ITU-T Recommendation H.225.0 between the gateway device GW and the gatekeepers GKA, GKB and GKC, is shown in FIG. 1 by dotted lines.

The area of a network managed by a gatekeeper is known as a zone in accordance with the H.323 Recommendation. A VoIP network domain may have a single zone or multiple zones. In the exemplary embodiment the VoIP network domains DA, DB and DC each consists of an individual zone and will thus each be administered centrally by an individual separate gatekeeper GKA, GKB or GKC independently of each other. Furthermore the VoIP network domain DA contains terminals A1 and A2, the VoIP network domain DB terminals B1 und B2 and the VoIP network domain DC terminals C1 and C2. The terminals AI, A2, B1, B2, CI and C2 are packet-oriented VoIP communication terminals such as for example terminals for the voice, video, fax, data to our and/or multimedia communication with personal computers or communication applications or clients running on them. Terminals AI, A2, B1, B2, CI und C2 are each registered as VoIP end points with the gatekeeper GKA, GKB or GKC responsible for their VoIP network domains DA, DB or DC.

Figure 2:
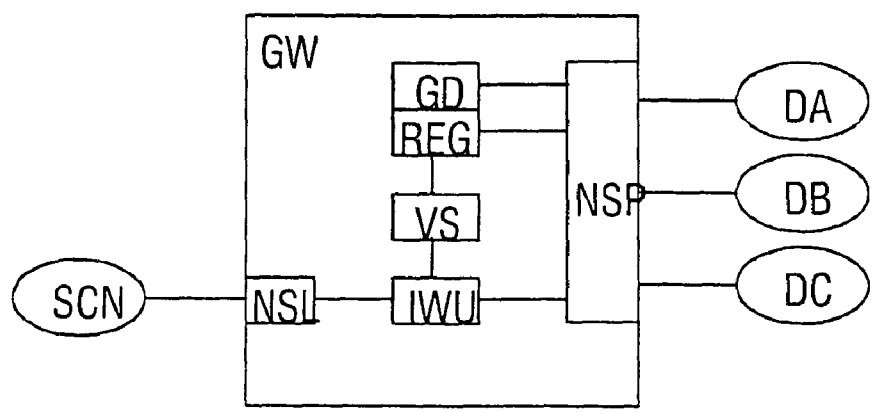
FIG. 2 is a block diagram of the gateway device in more detail.

FIG. 2 shows the gateway device GW in a more detailed diagram. The gateway device GW has a circuit-oriented interface NSL for connection to the switched-circuit communication network SCN as well as via packet-oriented interfaces NSP for connection of the VoIP network domains DA, DB and DC. The interfaces NSP are all preferably implemented by various Internet protocol-based ports. As further function components the gateway device GW includes an Interworking Unit IWU, a Connection Controller VS, a Polling Unit GD as well as a Registration Unit REG.

The Interworking Unit IWU is used for interworking between circuit-oriented protocols used in the SCN communication network and the packet-oriented protocols used in the VoIP network domains DA, DB und DC and is linked to the interfaces NSL and NSP.

The Connection Controller VS serves among other things to forward connections between the switched-circuit communication network SCN and the VoIP network domains DA, DB and DC as well as between the VoIP network domains DA, DB und DC themselves. The Connection Controller VS is linked to the Interworking Unit IWU, the Registration Unit REG as well as the Polling Unit GD.

The Polling Init GD is linked to the interfaces NSP and serves to determine transport addresses of the accessible gatekeepers, here GKA, GKB and GKC. A transport address includes in each case the Internet protocol address of the appropriate gatekeeper as well as the port number of the service to be used. The transport addresses are determined by broadcasting a request message, for example a Gatekeeper Request Message (GRQ) in accordance with ITU-T Recommendation X.225.0, into all VoIP network domains DA, DB and DC. The receipt of the request message causes the gatekeepers GKA, GKB and GKC to return their transport address to the requesting gateway device GW. Gatekeepers GKA, GKB and GKC are thus known in the gateway device GW. The Registration Unit REG is also linked to the interfaces NSP and serves to register the gateway device GW at all gatekeepers GKA, GKB and GKC known there and thus in all known VoIP network domains DA, DB and DC.

Figure 3:
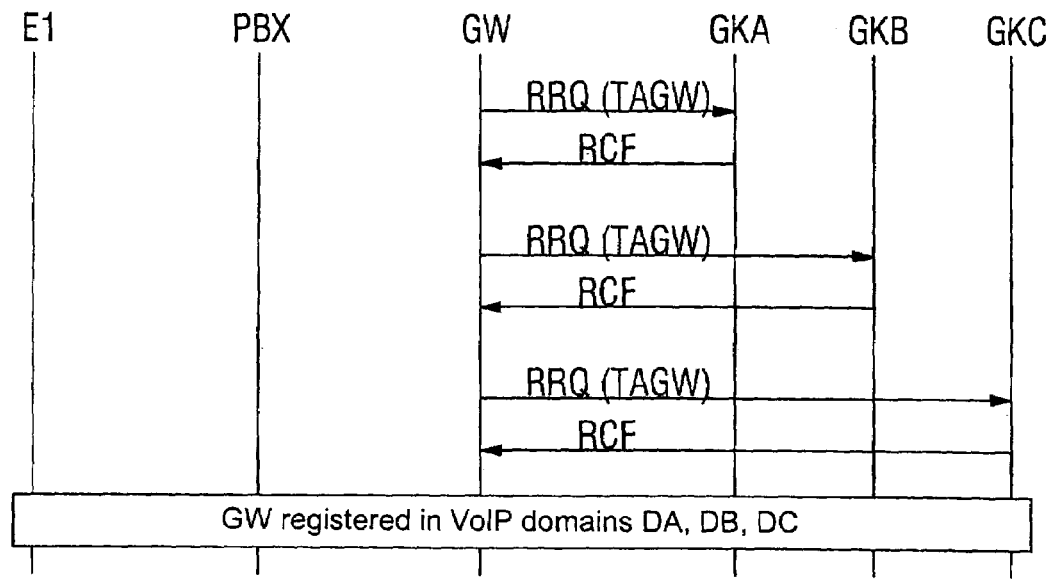
FIG. 3 is a flowchart to illustrate the signaling sequence on registration of the gateway device and FIG. 4 is a flowchart to illustrate the signaling sequence on setup of a connection spanning a several networks.

FIG. 3 shows a flowchart to illustrate the signaling sequence on registration of the gateway device GW in the various VoIP network domains DA, DB and DC. To perform the registration the Registration Unit REG transfers via interfaces NSP Registration request messages RRQ in accordance with the H.225.0 Recommendation, parallel or sequentially to all gatekeepers GKA, GKB and GKC known in the gateway device GW. The registration request messages RRQ are transferred using the transport addresses determined by the Polling Unit GD of gatekeeper GKA, GKB and GKC. With the registration request messages RRQ a transport address TAGW of the gateway device GW, i.e. of its Internet protocol address, as well as the port number of the corresponding service is transferred to the gatekeepers GKA, GKB und GKC and is stored there. If necessary operating information, such as the number of available communication channels to gatekeepers GKA, GKB and GKC, can be transferred with the registration request messages RRQ. Using the stored transport address TAGW in each case the gatekeepers GKA, GKB and GKC can forward cross-network connections to or via the gateway device GW.

After receipt of the relevant registration request message RRQ the gatekeepers GKA, GKB and GKC transfer independently of each other a registration confirmation message RCF, in accordance with the H.225.0 Recommendation, to the gateway device GW.

By transferring the registration request message RRQ the gateway device GW registers itself with all gatekeepers GKA, GKB and GKC and thereby in all VoIP network domains DA, DB and DC as a VoIP end point and especially as a VoIP gateway end point. This means that the gateway device GW is simultaneously registered at all connected VoIP domains DA, DB and DC and known as a VoIP gateway end point and can be used as a network interworking device for connections between terminals EI and E2 of the switched-circuit communication network SCN and terminals A1, A2, B1, B2, CI and C2 of all VoIP network domains DA, DB and DC. In contrast to the prior art, instead of three domain-specific gateways, this requires only a single gateway device GW.

Figure 4:
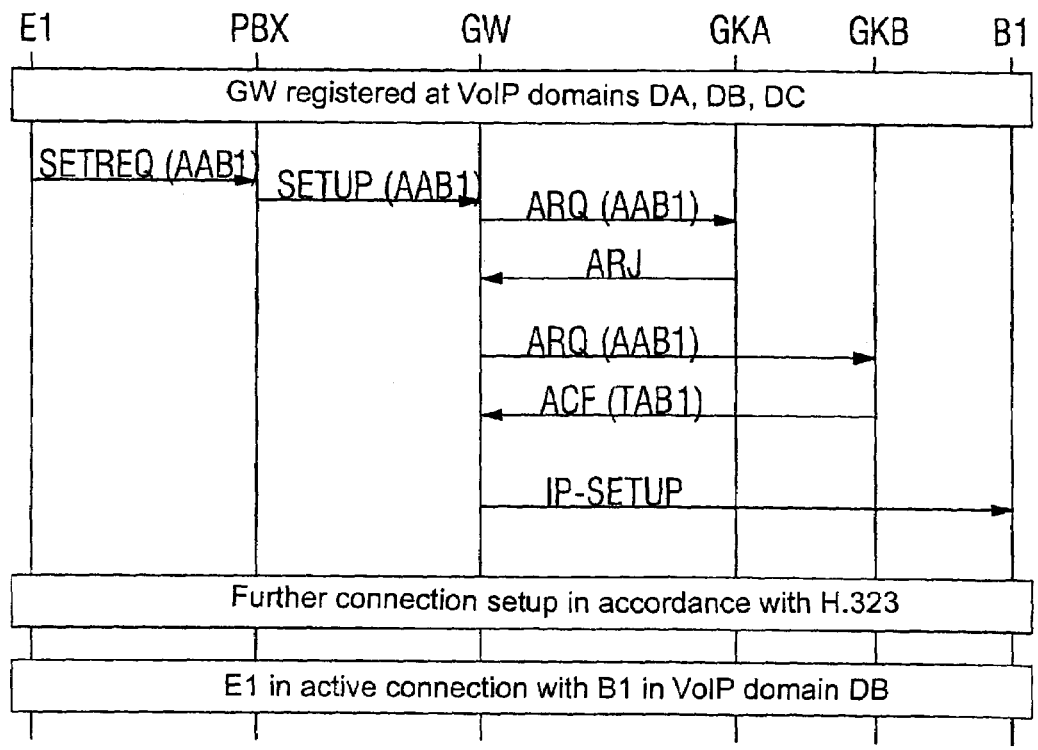

Finally FIG. 4 shows a flowchart to illustrate the signaling sequence on setup of a connection between networks from terminal EI to terminal equipment B1. Terminal E1 causes the connection to be set up by transferring a setup request message SETREQ to the switching unit PBX. The setup request message SETREQ contains as its destination address information an alias address AAB1 identifying the destination terminal equipment BI. The alias address AAB1 can for example be a Uniform Resource Locator (URL), an E.164 or PNP telephone number for a Private Numbering Plan (PNP) or an e-mail address. As a result of the receipt of the connection setup message SETREQ the switching unit PPX sends a circuit-oriented connection setup message SETUP, e.g., a setup message in accordance with the QSIG protocol, with the alias address AAB1 to gateway device GW.

The connection controller VS receives the connection setup message SETUP and in response transfers an admission request message ARQ in accordance with the H.225.0 Recommendation with the alias address AAB1 to the gatekeeper GKA. Through the admission request message a request is sent to the receiving gatekeeper to ask whether it admits the connection to be set up. In addition the admission request message ARQ also functions as an address resolution request message for resolving the alias address AAB1.

In the present exemplary embodiment the destination address AAB1 is not known in the VoIP network domain DA, as a result of which the gatekeeper GKA returns an admission reject message ARJ in accordance with the H.225.0 Recommendation to the gateway device GW. The gateway device GW then repeats the admission request for the other known gatekeepers until such time as the gatekeeper can resolve the destination address information AAB1.

In the present exemplary embodiment a further admission request message ARQ with the alias address AAB1 is transferred to the gatekeeper GKB. Since the terminal equipment B1 belongs to the VoIP zone of the gatekeeper GKB and is known to the latter, the gatekeeper GKB can resolve the alias address AAB1 into a transport address TABI for the VoIP network domain DB. The transport address TABI includes the Internet protocol address (IP address) of that device in the VoIP network domain DB to which as part of the further connection setup a packet-oriented connection setup message IPSETUP is to be transferred by the gateway device GW. This device can in the so-called "Direct Routed Model" be the destination end device B1 and in the so-called "Gatekeeper Routed Model" the Gatekeeper GKB. In the "Gatekeeper Routed Model" the gatekeeper GKB forwards the packet-oriented connection setup message IP-SETUP to the destination device B1.

In the present exemplary embodiment the "Direct Routed Model" is used. Accordingly the transport address TABI includes the Internet protocol address of terminal equipment B1. Furthermore the transport address TABI includes a port number of the communication service concerned.

After successfully resolving the address the gatekeeper GKB transfers an admission confirm message ACF in accordance with the H.225.0 Recommendation, with the transport address TABI for the gateway device GW. Its connection controller VS sends as a result the packet-oriented connection setup message IP-SETUP, e.g., a setup message in accordance with the H.225.0 Recommendation, to the terminal equipment B1 identified by the transport address TAB1.

The further connection setup between the terminal EI and the terminal equipment B1 is undertaken on the VoIP network domain DB side in accordance with the H.323 Recommendation and on the circuit-switched communication network SCN side in accordance with the QSIG-Standard, whereby the gateway device GW functions as a network interworking unit.

Since in the present exemplary embodiment the gatekeeper GKB can already resolve the alias address AAB1, no further admission request message ARQ will be sent to the gatekeeper GKC.

Alternatively to a sequential transmission of admission request messages ARQ these can be transferred in parallel to all gatekeepers GKA, GKB und GKC known in the gateway device GW. In this case the gateway device GW can wait until the arrival of an admission confirmation message ACF from one of the gatekeepers and Subsequently transfer the connection setup message IP-SETUP to this gatekeeper. According to a variant of the invention the gateway device GW can initially evaluate the received alias address AAB1 and depending on this transfer the admission request message ARQ to one of the gatekeepers GKA, GKB or GKC. Prefixes or prefix numbers selected for example at terminal device E1 which identify one of the network domains DA, DB or DC can be used as an evaluation criterion here for example.

As well as for communication between the switched-circuit communication network SCN and the packet-oriented VoIP network domains DA, DB and DC the gateway device GW can also be used for connections between the VoIP network domains DA, DB and DC themselves, i.e. typically for connections between the terminal devices A1 and B1. This is especially advantageous when the VoIP network domains DA and DB do not allow any direct exchange of data packets. In this case a connection can be routed from the VoIP network domain DA via the gateway device GW and the switching unit PBX to the VoIP network domain DB.

The invention has been described in detail with particular reference to preferred embodiments thereof and examples, but it will be understood that variations and modifications can be effected within the spirit and scope of the invention.

The invention claimed is:

1. A method for communication between a switched-circuit network and at least two Voice over Internet Protocol network domains, each featuring packet-based signaling control, comprising:
    transferring registration request messages from a gateway device, connected between the switched-circuit communication network and the Voice over Internet Protocol network domains, to a signaling controller in each of the Voice over Internet Protocol network domains, respectively;
    simultaneously registering the gateway device in the Voice over Internet Protocol network domains as a Voice over Internet Protocol termination point in response to the registration request messages; and
    receiving, at the gateway device from the switched-circuit communication network after said registering, a circuit-oriented connection setup message with destination address information identifying the communication destination;
    evaluating at the gateway device the destination address information; and
    determining at the gateway device, based on the destination address information, a choice relating to further connection setup between the Voice over Internet Protocol network domains.

2. A method as recited in claim 1, wherein the registration request messages are transferred in parallel to the signaling controller in each of the Voice over Internet Protocol network domains.

3. A method as recited in claim 2, further comprising determining a network address of the signaling controller in each of the Voice over Internet Protocol network domains by broadcasting from the gateway device a request message into the Voice over Internet Protocol network domains, and
    wherein said transferring transfers the registration request messages using the network address of the signaling controller in each of the Voice over Internet Protocol network domains.

4. A method as recited in claim 3, further comprising after said registering of the gateway device:
    receiving, at the gateway device from the switched-circuit communication network, a circuit-oriented connection setup message with destination address information which identifies a communication destination;
    transferring, from the gateway device to the signaling controller in each of the Voice over Internet Protocol network domains, an address resolution request message with the destination address information; and
    transferring a packet-oriented connection setup message into the Voice over Internet Protocol network domains for which the signaling controller returns an address confirmation message indicating a successful address resolution of the destination address information.

5. A gateway device for communication between a switched-circuit communication network and Voice over Internet Protocol network domains, each Voice over Internet Protocol network domain having a packet-based signaling controller, comprising:
    interfaces coupled to the switched-circuit communication network and the Voice over Internet Protocol network domains;
    a registration device, coupled to said interfaces, to transfer a registration request message to the packet-based signaling controller in each of the Voice over Internet Protocol network domains for simultaneous registration of the gateway device in each of the Voice over Internet Protocol network domains as a Voice over Internet Protocol end point; and
    a connection controller to receive from the switched-circuit communication network a circuit-oriented connection setup message with destination address information identifying a communication destination, to evaluate the destination address information and to make a selection affecting further connection setup between the Voice over Internet Protocol network domains based on evaluation of the destination address information.

6. A gateway device as recited in claim 5, further comprising a polling unit for broadcasting an address resolution request message into the Voice over Internet Protocol network domains to determine a network address of the packet-based signaling controller in each of the Voice over Internet Protocol network domains to be used for transmission of the registration request message.

7. A gateway device as recited in claim 6, further comprising a connection controller to receive from the switched-circuit communication network a circuit-oriented connection setup message with destination address information identifying a communication destination, to transfer address resolution request messages including the destination address information to the packet-based signaling controller in each of the Voice over Internet Protocol network domains, and to transfer a packet-oriented connection message into the Voice over Internet Protocol network domains for which the packet-based signaling controller returns an address confirmation message indicating a successful address resolution of the destination address information.

8. A communication system, comprising a switched-circuit communication network;

Voice over Internet Protocol network domains, each Voice over Internet Protocol network domain having a packet-based signaling controller; and a gateway device, including interfaces coupled to said switched-circuit communication network and said Voice over Internet Protocol network domains;

a registration device, coupled to said interfaces, to transfer a registration request message to the packet-based signaling controller in each of said Voice over Internet Protocol network domains for simultaneous registration of the gateway device in each of said Voice over Internet Protocol network domains as a Voice over Internet Protocol end point; and a connection controller to receive from the switched-circuit communication network a circuit-oriented connection setup message with destination address information identifying a communication destination, to evaluate the destination address information and to make a selection affecting further connection setup between the Voice over Internet Protocol network domains based on evaluation of the destination address information.

9. A communication system as recited in claim 8, wherein said gateway device further includes a polling unit for broadcasting an address resolution request message into said Voice over Internet Protocol network domains to determine a network address of the packet-based signaling controller in each of said Voice over Internet Protocol network domains to be used for transmission of the registration request message.

10. A communication system as recited in claim 9, wherein said gateway device further includes a connection controller to receive from said switched-circuit communication network a circuit-oriented connection setup message with destination address information identifying a communication destination, to transfer address resolution request messages including the destination address information to the packet-based signaling controller in each of said Voice over Internet Protocol network domains, and to transfer a packet-oriented connection message into said Voice over Internet Protocol network domains for which the packet-based signaling controller returns an address confirmation message indicating a successful address resolution of the destination address information.

11. A communication system as recited in claim 9, wherein said gateway device further includes a connection controller to receive from said switched-circuit communication network a circuit-oriented connection setup message with destination address information identifying a communication destination, to evaluate the destination address information and to make a selection affecting further connection setup between said Voice over Internet Protocol network domains based on evaluation of the destination address information.

* * * * *